Patented July 27, 1937

2,088,250

UNITED STATES PATENT OFFICE 2,088,250

PROCESS FOR THE SEPARATION OF PRECIOUS METALS FROM GOLD METAL CONTAINING MATERIALS

Wilhelm Truthe, Frankfort-on-the-Main, Germany, assignor to Deutsche Gold & Silber Scheideanstalt vormals Roessler, Frankfort-on-the-Main, Germany, a corporation No Drawing. Application January 31, 1935, Serial No. 4,411. In Germany February 6, 1934

8 Claims. (Cl. 204—57)

Object of my invention is a process for separation of precious metals and non-precious metals from materials which have a relatively high content of gold but, on the other hand, are free from, or poor in platinum and which, in addition to gold, contain copper and/or silver and as the case may be, further non-precious metals. Gold coins come chiefly in consideration, furthermore mining golds, old golds such as, for instance, jewellers' golds and the like.

According to my invention the separation of gold is effected by subjecting the material to be separated to electrolysis whereby the material itself forms the anode and the electrolyte consists according to my invention of hydrochloric acid and if desired non-precious metal chlorides and is free from chloride of the precious metals. The current density during the electrolysis should be 1200 amperes per square meter or more. The sludge obtained at the cathode is subsequently in order to remove from it any accompanying metal such as copper, silver or the like worked up in any of the well known ways. If silver is present in the sludge for instance, in the shape of silver chloride it is preferably subjected to preliminary reduction.

If electrolytes which are free from the chlorides of precious metals are used in accordance to my invention and if the same conditions are observed the gold and copper are deposited on the cathode in the form of an extremely fine sludge whilst silver separates in the shape of silver chloride. This sludge can easily be manipulated in order to separate the copper or the silver respectively from the gold in accordance with one of the well known methods whilst any other metals which might have been present in the starting material remain dissolved in the electrolyte.

When materials are subjected to the process of gold separation hitherto known such as for instance the process known by the name of Miller's process, generally great losses in gold occur since in Miller's process the silver chloride obtained by chlorination with gaseous chlorine retains not inconsiderable quantities of the gold, above all if the fineness of the gold aimed at is increased above 997/000. In consequence, when working this process a greater fineness than the one mentioned can not be obtained on an economic basis.

By carrying out the process of my invention, however, a fineness of 999/000 and more may be easily obtained without it being necessary to submit any residues to a further treatment in order to gain any fractions of gold taken up by them or to avoid any losses of gold which are otherwise unavoidable. By my process therefore a refining separation and parting which has hitherto been indispensable when working the ordinary well known processes for gold separation such as, for instance, the Wohlwill process, is done away with.

In the gold separation according to Wohlwill electrolytes which contain hydrogen chloride and gold chloride are used with current densities which are lower than those which are employed in my process. The gold is deposited from such a bath in the form of compact deposits on the cathode which adhere firmly and which are attacked, for instance, by acids only with difficulty.

The sludge obtained according to my invention may be treated for separating copper or silver or both from the gold contained therein by subjecting it, for instance, to a treatment with nitric acid, sulphuric acid and the like.

In consequence of its fine state of division the cathode sludge obtained according to my invention is easily attacked by such reagents as nitric acid, so that any accompanying metals are dissolved without any difficulty. The gold remains in a pure state and possesses, as already mentioned, a fineness up to 999/000 and more without any further treatment.

I have found it especially useful to employ as electrolyte a bath which in addition to hydrochloric acid contains copper halides such as copper chloride. The sludge obtained on electrolysis from a bath of this description is especially voluminous and therefore may be worked up with particular ease since the metals deposited are present in a free state and are not alloyed with each other. A crude hydrochloric acid may be used as electrolyte which with advantage contains about 100 grs. HCl per liter and has the specific gravity of 1.19. The electrolysis may be carried out in electrolyzer with or without a diaphragm. Remainders of the anode which when, for instance, subjected to an acid treatment and which because of their compactness are not easily attacked by the acid may with advantage be removed for instance from the cathode sludge obtained during the electrolysis by sieving. The electrolysis itself may be carried out at an increased temperature of the bath, for instance at about 70° centigrade.

The cathode sludge may be worked up in the well known way in order to separate the non-precious metals from the gold, for instance, by treating it with acid. If silver is present, which will be the case when old gold is separated the silver occurs in the cathode sludge in the form of silver chloride. In this case the cathode sludge before being worked up is preferably subjected to a treatment by which the silver or the silver chloride respectively is separated from the other material before any subsequent treatment. The separation may be effected in the case of silver chloride being present, by a treatment with for instance ammonia or a solution of sodium thiosulfate. Another way of separating the silver consists in subjecting the sludge to a treatment which converts the silver chloride into a form by which it becomes soluble in acid. Such a treatment may consist in a reduction of the sludge such as for instance with zinc and acid whereby the silver chloride is converted into metallic silver which, then, is soluble in nitric acid or sulphuric acid. After the silver chloride has been converted into metallic silver the cathode sludge is subjected to a treatment with concentrated sulphuric acid, for instance by boiling, whereby metallic silver is separated from the gold.

Instead of extracting the cathode sludge with acid it may be treated with chlorine in such a way that either chlorine is introduced into the sludge which has been previously suspended in water or by saturating the sludge either in a moist or dry state with chlorine gas. This saturation may take place either in the cold or at an increased temperature.

The chlorine used may be generated, also, by admixing suitable mixtures for yielding chlorine to the sludge. Such a mixture is for instance potassium chlorate and hydrochloric acid which in the cold or at higher temperatures yield chlorine gas.

After the sludge has been treated in the manner described it is leached with water, dilute acid or the like whereby the hydrochlorides of the non-precious metals are dissolved. Any silver chloride which may still be present can be removed by treatment with solvents such as thiosulfate solution, ammonia or the like or by any other separating methods known.

According to the process of my invention a gold of very great fineness is obtained immediately by a very simple and economic process, the process having the particular advantage that the valuable precious metal is not retained for any length of time in solution or in any other intermediary products so that its value is at once available and no interest on the capital is lost.

What I claim is:

1. A process for the separation of gold from gold alloys containing substantial amounts of gold, but which are substantially free from platinum, which comprises electrolyzing said alloy as an anode in an aqueous chloride solution which only contains the gold ions which have been dissolved from the anode during the electrolysis at current densities of substantially not less than 1200 amperes per square meter to deposit sludge upon the cathode, removing the cathodic sludge and leaching out the impurities to leave substantially pure gold.

2. A process for the separation of gold from gold alloys containing substantial amounts of gold, but which are substantially free from platinum, which comprises electrolyzing said alloy as an anode in a bath which contains hydrochloric acid but which only contains the gold ions which have been dissolved from the anode during the electrolysis at current densities of substantially not less than 1200 amperes per square meter to deposit sludge upon the cathode, removing the cathodic sludge and leaching out the impurities to leave substantially pure gold.

3. A process for the separation of gold from gold alloys containing substantial amounts of gold, but which are substantially free from platinum, which comprises electrolyzing said alloy as an anode in a bath which contains hydrochloric acid of a specific gravity of 1.19 but which only contains the gold ions which have been dissolved from the anode during the electrolysis at current densities of substantially not less than 1200 amperes per square meter to deposit sludge upon the cathode, removing the cathodic sludge and leaching out the impurities to leave substantially pure gold.

4. A process for the separation of gold from gold alloys containing substantial amounts of gold, but which are substantially free from platinum, which comprises electrolyzing said alloy as an anode in a bath which contains hydrochloric acid and cupric chloride, but which only contains the gold ions which have been dissolved from the anode during the electrolysis at current densities of substantially not less than 1200 amperes per square meter to deposit sludge upon the cathode, removing the cathodic sludge and leaching out the impurities to leave substantially pure gold.

5. The process for the separation of gold from gold alloys containing silver, non-precious metals and substantial amounts of gold, but which are substantially free from platinum, which comprises electrolyzing said alloy as an anode in a bath which contains hydrochloric acid but which only contains the gold ions which have been dissolved from the anode during the electrolysis at current densities of substantially not less than 1200 amperes per square meter to deposit sludge upon the cathode, removing the cathodic sludge, subjecting the cathodic sludge obtained to a treatment by which the non-precious metals are converted into a form soluble in water, extracting the latter with water and removing the silver chloride to leave substantially pure gold.

6. The process for the separation of gold from gold alloys containing silver, non-precious metals and substantial amounts of gold, but which are substantially free from platinum, which comprises electrolyzing said alloy as an anode in a bath which contains hydrochloric acid but which only contains the gold ions which have been dissolved from the anode during the electrolysis at current densities of substantially not less than 1200 amperes per square meter to deposit sludge upon the cathode, removing the sludge, dissolving the silver chloride contained in said sludge and subjecting the remaining sludge to a treatment with acids to remove the impurities to leave substantially pure gold.

7. The process for the separation of gold from gold alloys containing silver, non-precious metals and substantial amounts of gold, but which are substantially free from platinum, which comprises electrolyzing said alloy as an anode in a bath which contains hydrochloric acid but which only contains the gold ions which have been dissolved from the anode during the electrolysis at current densities of substantially not less than 1200 amperes per square meter to deposit sludge upon the cathode, removing the cathodic sludge, reducing the silver chloride contained in said sludge to metallic silver, and treating the product to dissolve the silver and the non-precious metals to leave substantially pure gold.

8. The process for the separation of gold from gold alloys containing silver, non-precious metals and substantial amounts of gold, but which are substantially free from platinum, which comprises electrolyzing said alloy as an anode in a bath which contains hydrochloric acid but which only contains the gold ions which have been dissolved from the anode during the electrolysis at current densities of substantially not less than 1200 amperes per square meter to deposit sludge upon the cathode, removing the cathodic sludge, reducing the silver chloride contained in said sludge to metallic silver and treating the product obtained with an acid of the group consisting of sulphuric acid and nitric acid to remove the impurities to leave substantially pure gold.

WILHELM TRUTHE.